(12) United States Patent
Dehlsen et al.

(10) Patent No.: US 8,803,487 B2
(45) Date of Patent: Aug. 12, 2014

(54) ROTATING KINETIC AND POTENTIAL ENERGY FREQUENCY REGULATION DEVICE FOR FAST RESPONSE LARGE SCALE ELECTRIC POWER APPLICATIONS

(75) Inventors: James G. P. Dehlsen, Santa Barbara, CA (US); Mauricio Quintana, Glastonbury, CT (US)

(73) Assignee: Dehlsen Associates, LLC, Santa Barbara, CA (US)

( * ) Notice: Subject to any disclaimer, the term of this patent is extended or adjusted under 35 U.S.C. 154(b) by 0 days.

(21) Appl. No.: 13/602,103

(22) Filed: Sep. 1, 2012

(65) Prior Publication Data
US 2014/0062423 A1    Mar. 6, 2014

(51) Int. Cl.
*H02K 7/02* (2006.01)

(52) U.S. Cl.
USPC .................................. 322/4; 322/29

(58) Field of Classification Search
USPC ............ 322/29, 4; 290/1 R, 1 E, 1 C; 310/74; 74/572.1, 572.2, 573.1, 573.12, 574.1, 74/574.2; 73/535
See application file for complete search history.

(56) References Cited

U.S. PATENT DOCUMENTS

| | | | |
|---|---|---|---|
| 373,061 A | 11/1887 | Easton | |
| 424,418 A | 3/1890 | Hitt | |
| 1,033,248 A * | 7/1912 | Johnson | 73/544 |
| 1,952,030 A | 3/1934 | Korfhage | |
| 2,234,314 A * | 3/1941 | Amedee | 73/546 |
| 2,374,434 A * | 4/1945 | Jensen | 192/104 R |
| 3,405,278 A | 10/1968 | Ley | |
| 3,986,580 A | 10/1976 | Dennis | |
| 4,310,284 A * | 1/1982 | Randolph | 416/132 B |
| 5,269,197 A | 12/1993 | Yang | |
| 5,519,267 A * | 5/1996 | Pentecost | 310/17 |
| 6,614,132 B2 | 9/2003 | Hockney et al. | |
| 7,127,886 B2 | 10/2006 | Fielder | |
| 2005/0196281 A1* | 9/2005 | Kim et al. | 416/132 B |
| 2010/0117375 A1* | 5/2010 | Kwok | 290/1 R |
| 2010/0199803 A1* | 8/2010 | Achiriloaie et al. | 74/574.2 |
| 2010/0231075 A1 | 9/2010 | Han et al. | |
| 2010/0237629 A1* | 9/2010 | Gray | 290/1 R |
| 2010/0251712 A1 | 10/2010 | Nakhamkin | |
| 2011/0120806 A1 | 5/2011 | Palmer | |
| 2011/0137481 A1 | 6/2011 | Manz et al. | |
| 2011/0211957 A1* | 9/2011 | Folsom et al. | 416/41 |

* cited by examiner

*Primary Examiner* — Tulsidas C Patel
*Assistant Examiner* — Sean Gugger
(74) *Attorney, Agent, or Firm* — Mary J. Gaskin

(57) ABSTRACT

A rotating device for multi-megawatt, fast response frequency regulation for the electric grid. The device generally has a main shaft coupled to a motor-generator, a main spring concentric to the main shaft, and several radially-symmetric arms, each connected to the main spring via a four-bar mechanism. As the rotational speed of the device increases, centrifugal force acting on the arms causes them to rise, the four-bar mechanism compresses the main spring, and energy is stored in the device as a combination of kinetic rotational energy, elastic potential energy, and gravitational potential energy. The device can be configured with additional springs, which can be compression springs, tension springs, or a combination thereof, in order to increase the amount of energy produced. Symmetrically-spaced gliding masses can be arranged on the arms as well.

27 Claims, 9 Drawing Sheets

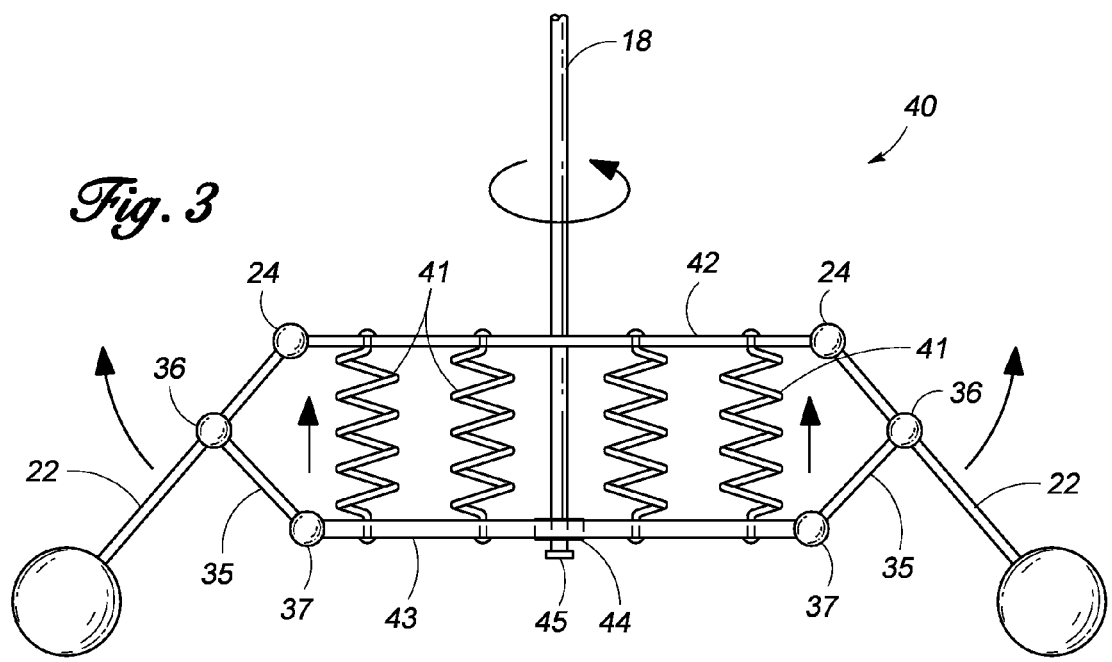
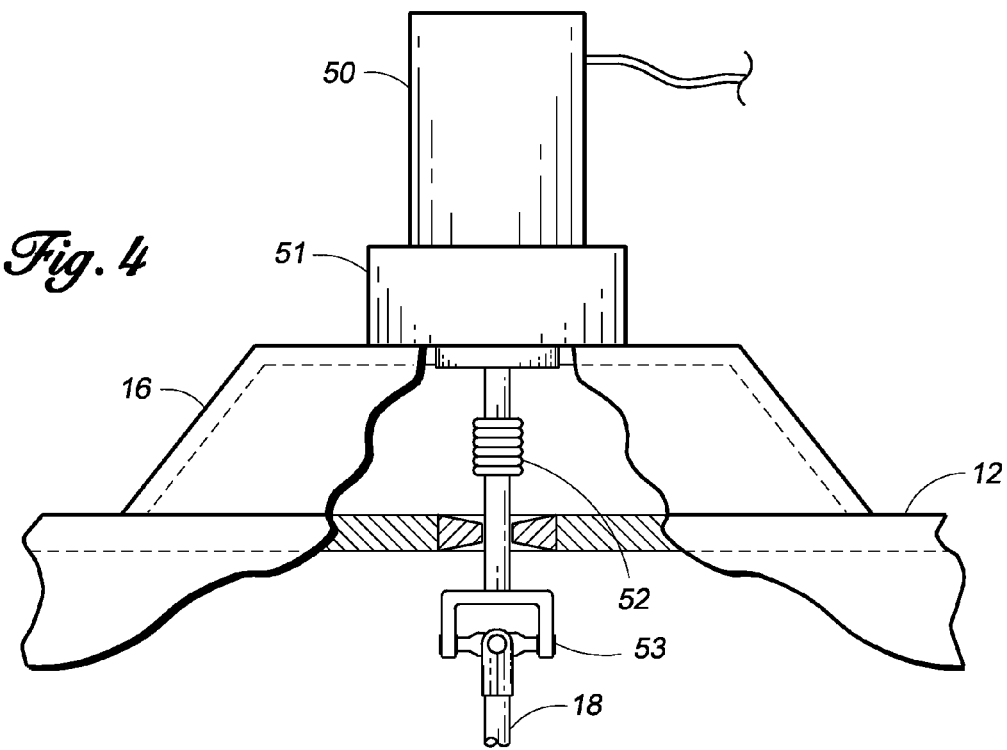

ROTATING KINETIC AND POTENTIAL ENERGY FREQUENCY REGULATION DEVICE FOR FAST RESPONSE LARGE SCALE ELECTRIC POWER APPLICATIONS

BACKGROUND OF THE INVENTION

1. Field of Invention

The invention relates to electric power generation, and, more specifically, to large scale electric power energy storage and fast response frequency regulation. The electric grid is continuously attempting to balance the load (demand) with the power capacity (supply) connected to the grid. A perfect balance between supply and demand is impossible without the use of energy storage, load banks, flexible power sources and fast response supply systems. Grid operators manage these supply demand discrepancies by forecasting capacity requirements several days in advance, but, inevitably, there are errors in the forecast or gaps in the planned supply. Therefore, the grid requires fast response multi-megawatt energy storage and delivery systems that can react to the grid's requirements in real time. This has been an elusive requirement. The most successful type of system in use today is pumped storage, but it is costly and difficult to build and contains significant inertia, so its response is relatively slow and better suited for non-real time applications. High speed flywheels have been used for this purpose, but high costs and lack of multi-megawatt capabilities have significantly limited their adoption. The present invention addresses these challenges.

2. Description of Prior Art

Energy storage systems for electric power frequency regulation have increased in importance with the introduction of intermittent power sources, including wind and solar plants. In order to work properly and address the needs of the electric grid, these storage systems need to be capable of storing or delivering several megawatts of electric power for relative short periods of time on the order of 4 to 20 seconds, with a round trip efficiency (RTE, defined as the average ratio of power output versus power input over a period of ~24 hours) greater than 70%, and capital costs in $/KW installed lower than the cost of adding new capacity, and a service life greater than twenty years. Because the currently-available and/or proposed energy storage systems fail to meet these requirements, inefficient and dated gas turbine power plants, or reciprocating engines known as "peakers", have seen a sharp increase in demand in recent years. These peaker power plants are relatively compact and easily deployed, but, because of their inefficiency and their use of fossil fuels, they offset the renewable benefits of the intermittent solar and wind farms.

The currently available and/or energy storage devices for electric power generation include compressed gas systems, battery based systems, pumped storage systems and high speed flywheels. For example, Nakhamkin, (US Publication 2010/0251712) describes a compressed air energy storage system with a relatively low RTE of 65% and high capital costs to implement. Manz (US Publication 2011/0137481) describes a battery-based energy storage system for wind farms, but the upfront costs of this system remain high and its service life inadequate. Ley (U.S. Pat. No. 3,405,278, 1965) describes a pumped storage system for hydroelectric plants; such systems represent the bulk of the energy storage and frequency regulation systems in use today, but their use is limited due to high capital costs, difficulty in finding proper sites, and the extensive permitting required. Hockney (U.S. Pat. No. 6,614,132, 2003), Gray (US Publication 2010/0237629), Han (US Publication 2010/0231075) and Palmer (US Publication 2011/0120806) all describe high speed flywheels, with a combination of vacuum chambers and magnetic levitation to minimize friction, hollow shafts and flexible materials to minimize structural stresses at higher speeds, and multiple flywheel systems. However, these flywheel systems are either too costly or cannot provide multi-megawatt capacity to the grid. In fact, the Hockney patent was owned by Beacon Power, a flywheel energy storage company that recently filed for bankruptcy due to the inadequate economics of these systems.

The present invention provides large scale multi-megawatt real time frequency regulation with round trip efficiencies of approximately 80% and above by using gravitational and elastic potential energy along with rotational kinetic energy storage. The embodiments involve energy storage in the form of rotational kinetic energy and potential energy in the form of compression and tension in springs, along with gravitational potential energy of a mass. Several other inventions have been described in applications unrelated to large scale electric power energy storage and frequency regulation. For example, Easton (U.S. Pat. No. 373,061, 1887) and Hitt (U.S. Pat. No. 424,418, 1890) describe clock winding mechanisms using a torsional spring. Korfhage (U.S. Pat. No. 1,952,030, 1931) describes an automatic clock winding mechanism that stores potential energy in both a torsional spring and in the rise/fall of several masses. Dennis (U.S. Pat. No. 3,986,580, 1975) describes an energy storage device that can be used in mechanical transmissions, in which energy stored in several linear springs is arranged as an equivalent torsional spring. Yang (U.S. Pat. No. 5,269,197, 1993) describes an air-stream activated energy storage device, in which energy is stored in springs that are compressed through centrifugal forces acting on inertial masses. Fielder (U.S. Pat. No. 7,127,886, 2006) describes a self-winding electric generator that provides consistent power from wind and other intermittent energy sources by incorporating the use of a torsional spring similar to that used in self-winding clocks. While the above inventions incorporate the use of springs to store energy and, in the case of Yang, a centrifugal force that acts upon a spring, none of them are designed for use as a fast response multi-megawatt frequency regulation device for the electric grid, independent of the energy source.

SUMMARY OF THE INVENTION

Briefly, the present invention relates to a method and apparatus of large scale, multi-megawatt, fast response frequency regulation for the electric grid. The device is characterized by having main shaft that is coupled to a motor-generator, a main linear spring that is concentric to the main shaft, and several radially-symmetric swinging arms that are each connected to the main spring via a four-bar mechanism consisting of four linkages and one degree of freedom, as defined by Gruebler's equation. This four-bar mechanism converts the swinging arms' rotational movement about a horizontal plane to a linear movement that compresses the main spring as the arms are raised due to the centrifugal forces acting on them as the rotational speed of the device increases.

In accordance with an aspect of the invention, the main shaft can either be directly coupled to the motor-generator known as direct drive, or it can be coupled first to a gear box, which, in turn, is connected to the motor-generator, which is known as geared drive.

In accordance with an aspect of the invention, the motor-generator unit consists of an alternating current induction motor that can be used as a motor when the grid signal requires the device to store electric energy or as a generator when the grid signal requires that the device deliver energy to the grid.

In accordance with a further aspect of the invention, the motor-generator unit consists of a direct current motor that can be used as a motor when the grid signal requires the device to store electric energy or as a generator when the grid signal requires that the device deliver energy to the grid. The direct current motor-generator would then be electrically connected to an inverter to convert alternating current from the grid to direct current and vice versa.

In accordance with a further aspect of the invention, the connection between the main shaft and the motor-generator unit or gearbox can be equipped with a flexible joint that allows the device to seek a dynamic equilibrium as it rotates; such a joint normally has three degrees of freedom and is known as a "universal joint" by those familiar with the art. In any case, either with or without the use of a flexible joint, a main bearing is used in the device such that the loads along the main shaft can be transmitted and supported by the main structure of the apparatus.

In accordance with a further aspect of the invention, the main structure that supports the device can be made of reinforced concrete, structural steel, wood, rock or a combination thereof, depending on the availability of these materials at the point of use and the configuration that minimizes the overall costs of the system. The structure can be installed below or above ground, depending on the needs and space restrictions at the site, but the structure would be equipped with proper access doors for maintenance.

In accordance with a further aspect of the invention, to smooth any spikes in the loads on the main shaft and on the elements attached to it, a flexible shaft and/or a slip clutch can be directly coupled to the main shaft and act as a mechanical "fuse" in order to protect the device or its components in case of extreme torque or flexion loads.

In accordance with a further aspect of the invention, the device can be built without any springs and configured only with swinging arms that are concentric to the main shaft and are symmetrically arranged about the shaft in order to achieve a dynamic balance; such arms rise and fall as the rotational speed increases and decreases, respectively.

In accordance with a further aspect of the invention, in order to minimize any asymmetric forces and moments induced by the rising or lowering of the radial arms, complexity, and parts count, the main spring that is concentric to the main shaft is a single spring. Alternatively, in order to ease assembly or manufacturing, instead of utilizing one main spring, several smaller springs can be connected in series and concentric to the main shaft.

In accordance with a further aspect of the invention, instead of a main concentric spring, smaller radially located concentric and symmetrically spaced springs can be used in conjunction with smaller, but more numerous, radial arms, symmetrically spaced about the center of the main shaft, with the smaller radially distributed springs being connected in parallel and having an equivalent spring constant as a main spring.

In accordance with a further aspect of the invention, the swinging radial arm can be equipped with a linear spring that is parallel and concentric to the arm which, in turn, is coupled to a mass that is symmetrically spaced about the arm in order to minimize unwanted moments and can glide along the arm with the use of a bushing or bearing to minimize friction. This mass accelerates as a result of the net acceleration along the arm, which is the result of the radial acceleration of the mass along the arm and the centrifugal acceleration about the center of rotation when using cylindrical coordinates to describe the motion.

In accordance with a further aspect of the invention, energy is stored in the proposed invention as a combination of kinetic rotational energy, which is proportional to the moment of inertia of the device and the square of the rotational speed, elastic potential energy, which is proportional to a spring's elastic coefficient and the square of its deformation, and gravitational potential energy, which is proportional to the vertical height increase of a mass.

In accordance with a further aspect of the invention, a significant amount of the energy stored in the device will be of the kinetic rotational type, which will increase as speed increases and which also increases drag induced losses with the surrounding air, but is limited by the increase in the moment of inertia resulting from the rise of the swinging arms as they extend as the speed increases. Inevitably, the kinetic energy stored decays due to both drag forces and frictional losses in the main bearing, whereas potential energy does not decay since conservative forces are involved. In order to minimize the decay of the kinetic energy stored, the device is equipped with the ability to store potential energy in springs and in masses as they rise. While the potential energy stored accounts for a smaller percentage of the total energy accumulated in the device, it delays the rate of kinetic energy decay and thus increases the round trip efficiency and economics of the device because the potential energy stored is quickly converted to kinetic energy and vice versa, on a real time basis.

In accordance with a further aspect of the invention, the device can be placed in a sealed enclosure that can be located above or below ground and from which air is extracted by means of a vacuum pump in order to reduce the air density in the enclosure and, therefore, reduce the drag losses of the system.

In accordance with a further aspect of the invention, the vacuum pump used to reduce drag can be either be driven with electricity from the grid or by direct coupling to the main shaft via a gear box or pulley belt/chain system.

In accordance with a further aspect of the invention, the arms, shaft and springs are all made of strong materials, including high tensile strength steel.

In accordance with a further aspect of the invention, the gliding masses that may be attached to each arm can be made of many types of materials, such as steel, lead, dirt, rock, and any other readily available material that minimizes cost without compromising the performance of the device.

BRIEF DESCRIPTION OF THE DRAWINGS

FIG. 3 is a partial side elevational view of an alternate embodiment of the present invention, which incorporates a plurality of springs arranged in parallel.

FIG. 4 is a partial side elevational view, partially broken away, of an alternate arrangement for coupling the shaft of the present invention to the motor-generator.

DESCRIPTION OF PREFERRED EMBODIMENT

Figure 1:
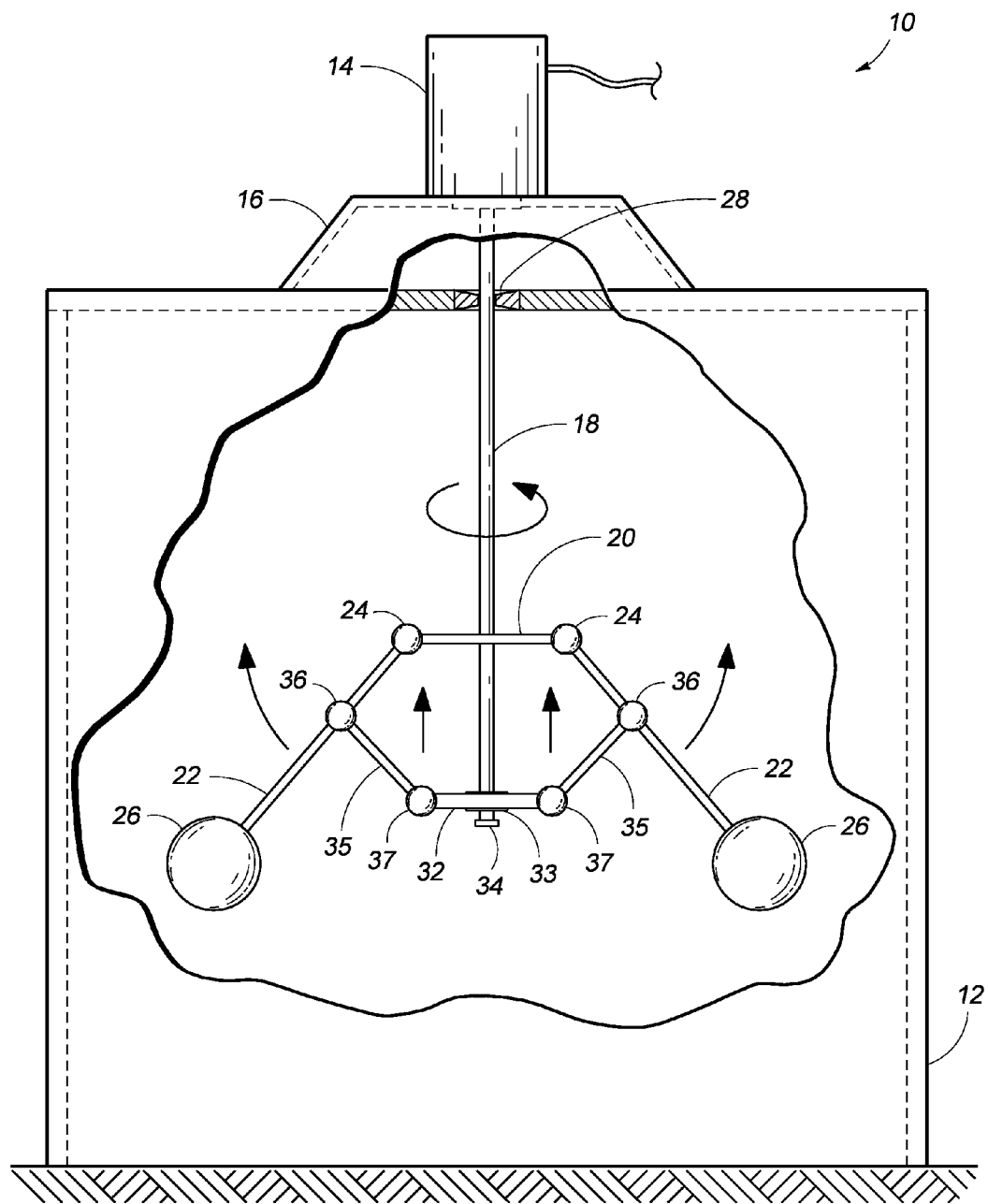
FIG. 1 is a side elevational view of the support structure holding the present invention, partially broken away to show the simplest embodiment thereof, with a four-bar mechanism.

The present invention relates to devices for fast response frequency regulation for large scale electrical power. In its simplest form shown in FIG. 1, the device 10 is mounted to and enclosed by support structure 12. The device 10 is driven by a motor-generator 14, which is mounted on a motor support 16 on top of support structure 12. The motor-generator 14 is directly coupled to a main shaft 18, which, in turn, is connected to a fixed plate 20. An end of each swinging arm 22 is pivotally connected to the outer edge, or circumference, of the fixed plate 20 at pivot point 24. Linkages 35, each having a first end connected to a swinging arm 22 at pivot point 36, have a second end connected to an outer edge of sliding plate 32 at pivot point 37, thereby coupling the sliding plate 32 to the swinging arms 22. The linkages 35 can be designed as rigid bars or can be high tensile strength cables, in order to reduce weight and cost. Each linkage 35 can be connected to the swinging arm 22 at any of a variety of pivot points 36, as long as the pivot points 36 are identical for all the linkages 35 of a particular device for proper balance. Sliding plate 32, which has a central opening with a bearing 33, allows the sliding plate 32 to slide upwards and downwards along the main shaft 18. A stopper 34 at the lower end of the main shaft 18 prevents the sliding plate 32 from falling off the main shaft 18. During energy storage, the motor-generator 14, acting as a motor, drives the main shaft 18, which rotates inside bearing 28, thereby rotating the fixed plate 20 with the attached swinging arms 22. As the swinging arms 22 rotate, centrifugal forces acting on the swinging arms 22 cause the free ends 26 of the swinging arms 22 to pivot upwards until they are aligned with the fixed plate 20, thereby storing both kinetic and potential energy. In the case of energy delivery, the device 10 transmits power to the motor-generator 5, acting as a generator, via the main shaft 18. As energy is transferred, the rotational speed of the device 10 decreases, and the free ends 26 of the swinging arms 22 fall when the centrifugal force component acting in the vertical direction is lower than the weight of the swinging arms 22.

Figure 2:
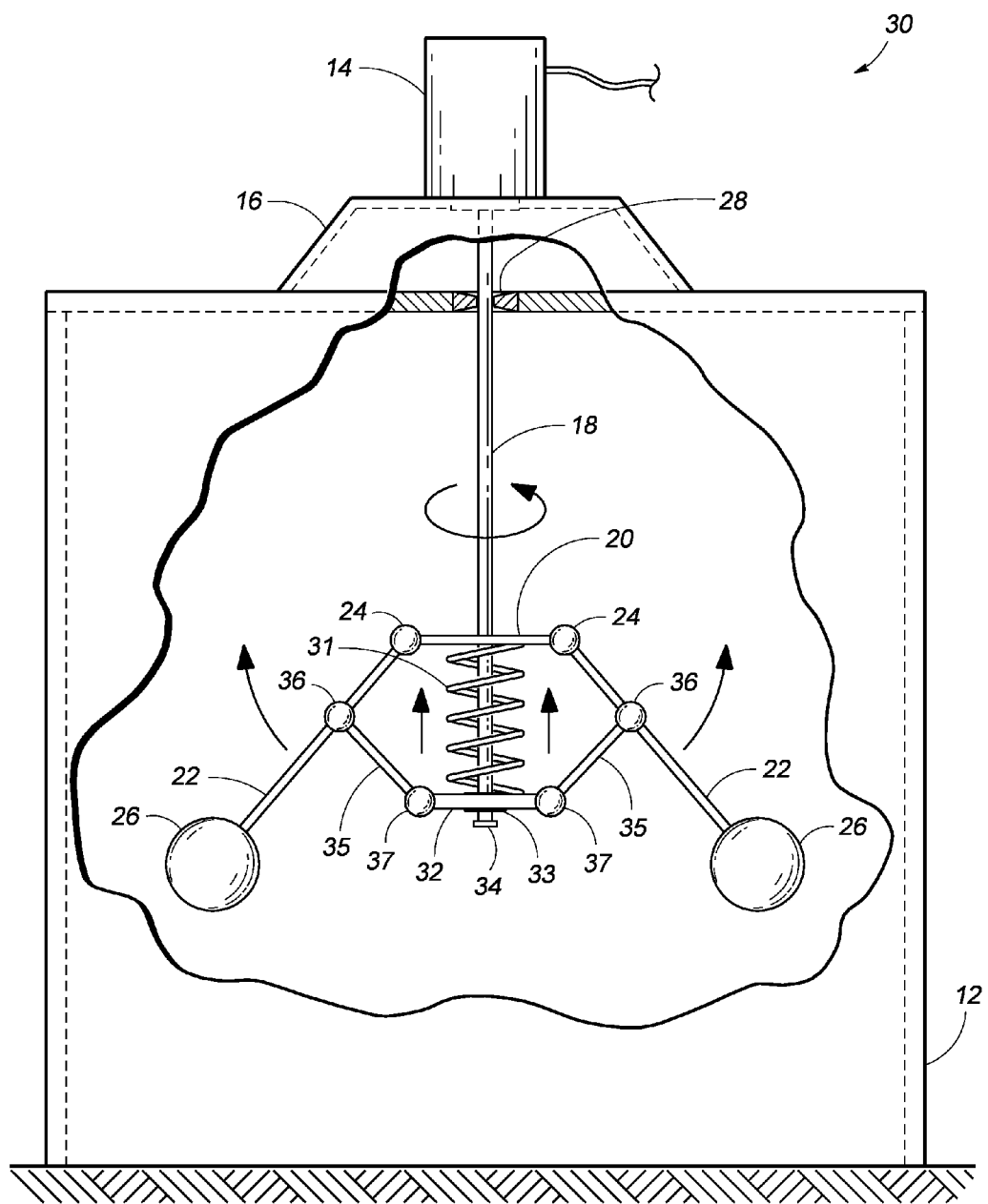
FIG. 2 is a side elevational view, partially broken away, of the support structure holding an embodiment of the present invention, which incorporates a main spring with the four-bar mechanism.

The device 30 shown in FIG. 2, which utilizes a main compression spring 31, is a preferred embodiment of this invention. The device 30 is driven by a motor-generator 14, which is mounted on a motor support 16 on top of a support structure 12. The motor-generator 14 is directly coupled to a main shaft 18, which, in turn, is connected to a fixed plate 20. The concentric main compression spring 31 is disposed around the main shaft 18 between the fixed plate 20 and a sliding plate 32, which has a central opening with a bearing 33, which allows the sliding plate 32 to slide upwards and downwards along the main shaft 18. A stopper 34 at the lower end of the main shaft 18 prevents the sliding plate 32 from falling off the main shaft 18. Linkages 35, each having a first end connected to a swinging arm 22 at pivot point 36, and a second end connected to an outer edge of the sliding plate 32 at pivot point 37, couple the sliding plate 32 to the swinging arms 22. The combination of the swinging arms 22, the linkages 25, the sliding plate 32, and the main shaft 18 constitute the basic elements of the four-bar mechanism that converts the rotational movement of the swinging arms 22 to linear motion of the sliding plate 32 used to compress the main spring 31. The linkages 35 can be designed as rigid bars or can be cables, in order to reduce weight and cost. Each linkage 35 can be connected to the swinging arm 22 at any of a variety of pivot points 36, as long as the pivot points 36 are identical for all the linkages 35 of a particular device. During energy storage, the motor-generator 14, acting as a motor, drives the main shaft 18, rotating the fixed plate 20 with attached swinging arms 22 and sliding plate 32. As the swinging arms 22 rotate, centrifugal forces acting on the swinging arms 22 cause the free ends 26 to pivot upwards, thereby also raising the sliding plate 32, which compresses the main compression spring 31 against the bottom of the fixed plate 20. Energy is stored as kinetic energy from the device's 30 rotating moment of inertia and potential energy in the main compression spring 31 as it is deformed and the mass of the swinging arms 25 as they pivot upwards.

FIG. 3 shows a device 40 similar to that shown in FIG. 2, utilizing a plurality of compression springs 41 instead of a single main compression spring 31. In this embodiment, both the fixed plate 42 and the sliding plate 43 have much larger radii. The compression springs 41 are symmetrically arranged so that each is parallel to the main shaft 18, each spring 41 having one end attached to the fixed plate 42 and a second end attached to the sliding plate 43. The sliding plate 43 has a bearing 44 which allows it to slide upwards and downwards along the main shaft 18. A stopper 45 prevents the sliding plate 43 from falling off the main shaft 18. An end of each swinging arm 22 is pivotally connected to the outer edge of the fixed plate 42 at pivot point 24. Linkages 35, each having a first end connected to a swinging arm 22 at pivot point 36 and a second end connected to an outer edge of the sliding plate 43 at pivot point 37, couple the sliding plate 43 to the swinging arms 22. When the main shaft 18 rotates, the fixed plate 42 with attached swinging arms 22 and sliding plate 43 also rotates, and centrifugal forces acting on the swinging arms 22 cause the free ends 26 to pivot upwards, thereby raising the sliding plate 43, which compresses the plurality of compression springs 41 against the bottom of the fixed plate 42. The amount of potential energy stored in the compression springs 41 increases with the number of such springs 41 used.

FIG. 4 shows an alternate arrangement for equipment used to drive the devices 10, 30, 40. A motor-generator 50 is directly coupled to a gear box 51, which, in turn, is coupled to a flexible shaft 52 that acts as a mechanical "fuse" to absorb torsion and flexion loads. The flexible shaft 52, in turn, is connected to a universal joint 53 that allows the device 10, 30, 40 to achieve a dynamic balance as it rotates. Alternatively, a slip clutch can be used instead of or in addition to the flexible shaft.

Figure 5:
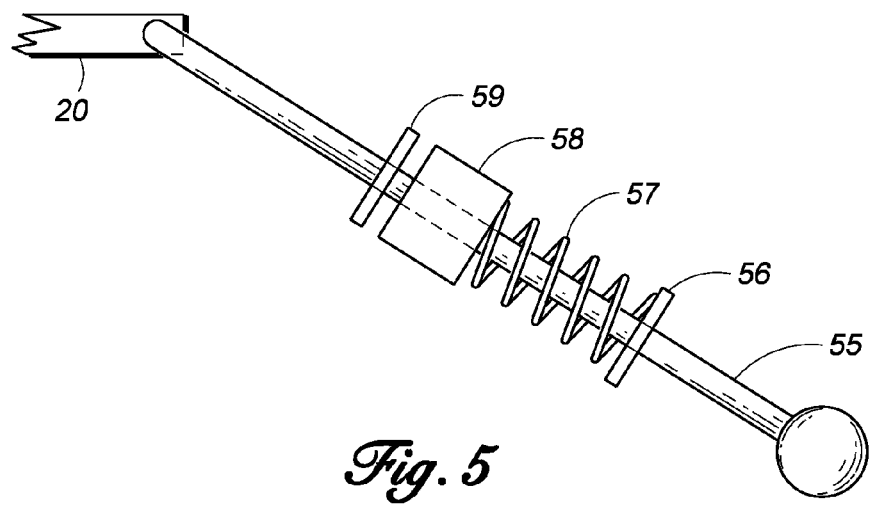
FIG. 5 is a side view of an alternate embodiment of one of the arms of the present invention, which incorporates a slidable mass and a spring.

FIG. 5 shows an alternate embodiment of a swinging arm 55. A first stopper 56 encircles the swinging arm 55, then a spring 57 is disposed on the swinging arm 55, then a mass 58 with a central bushing or bearing (not shown) is slid onto the swinging arm 55, and, finely, a second stopper 59 is affixed to the swinging arm 55. The swinging arm 55 is pivotally affixed to an outer edge of a fixed plate 20, as described, supra. As the swinging arm 55 rotates and rises, the mass 58 is accelerated due to net radial forces that act upon it, and the spring 57 is compressed. The result is an increase in the amount of potential energy stored in the spring 57, while taking advantage of the radial forces acting on the mass 58.

Figure 6:
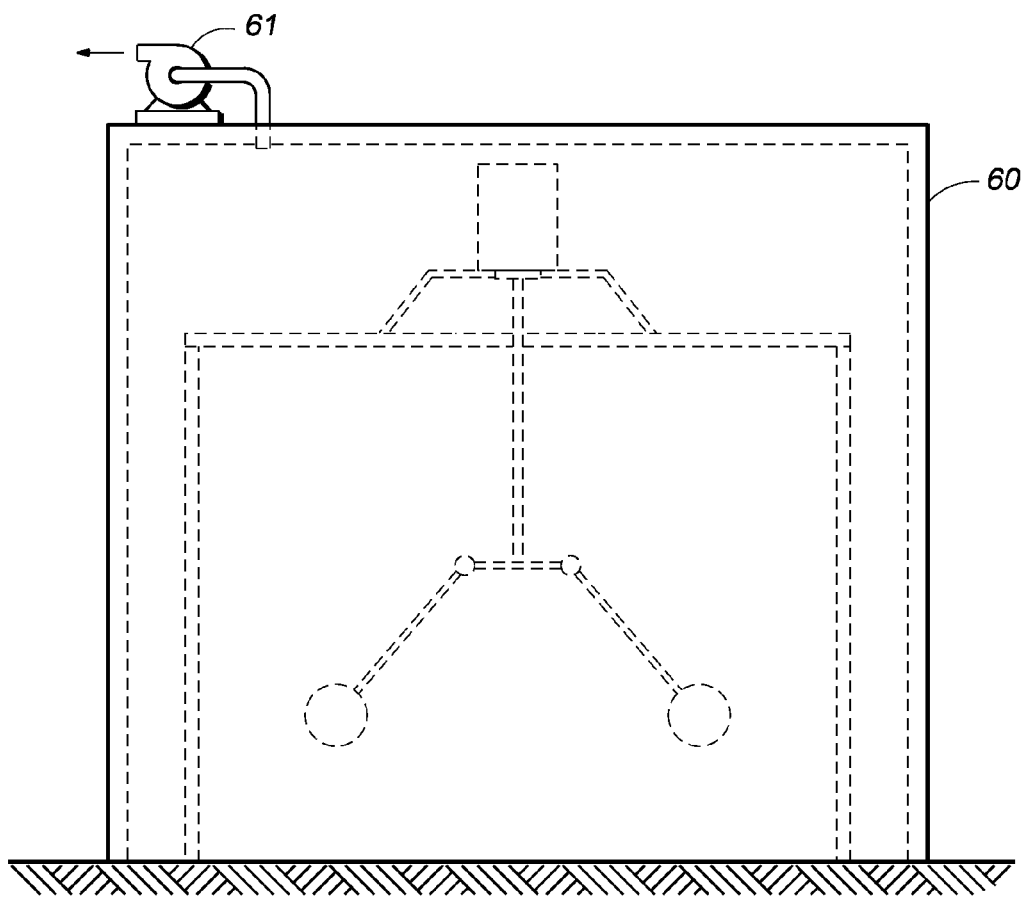
FIG. 6 is a side elevational view of an alternate support structure for the present invention, one which utilizes a vacuum pump.

As shown in FIG. 6, any of the embodiments of the present invention can be placed within an enclosure 60. A vacuum pump 61 can be used to reduce air density within the enclosure 60, thereby reducing the drag losses of the device. The vacuum pump 61 can be driven by electric current from the grid or by direct mechanical coupling to the main shaft (not shown).

Figure 7:
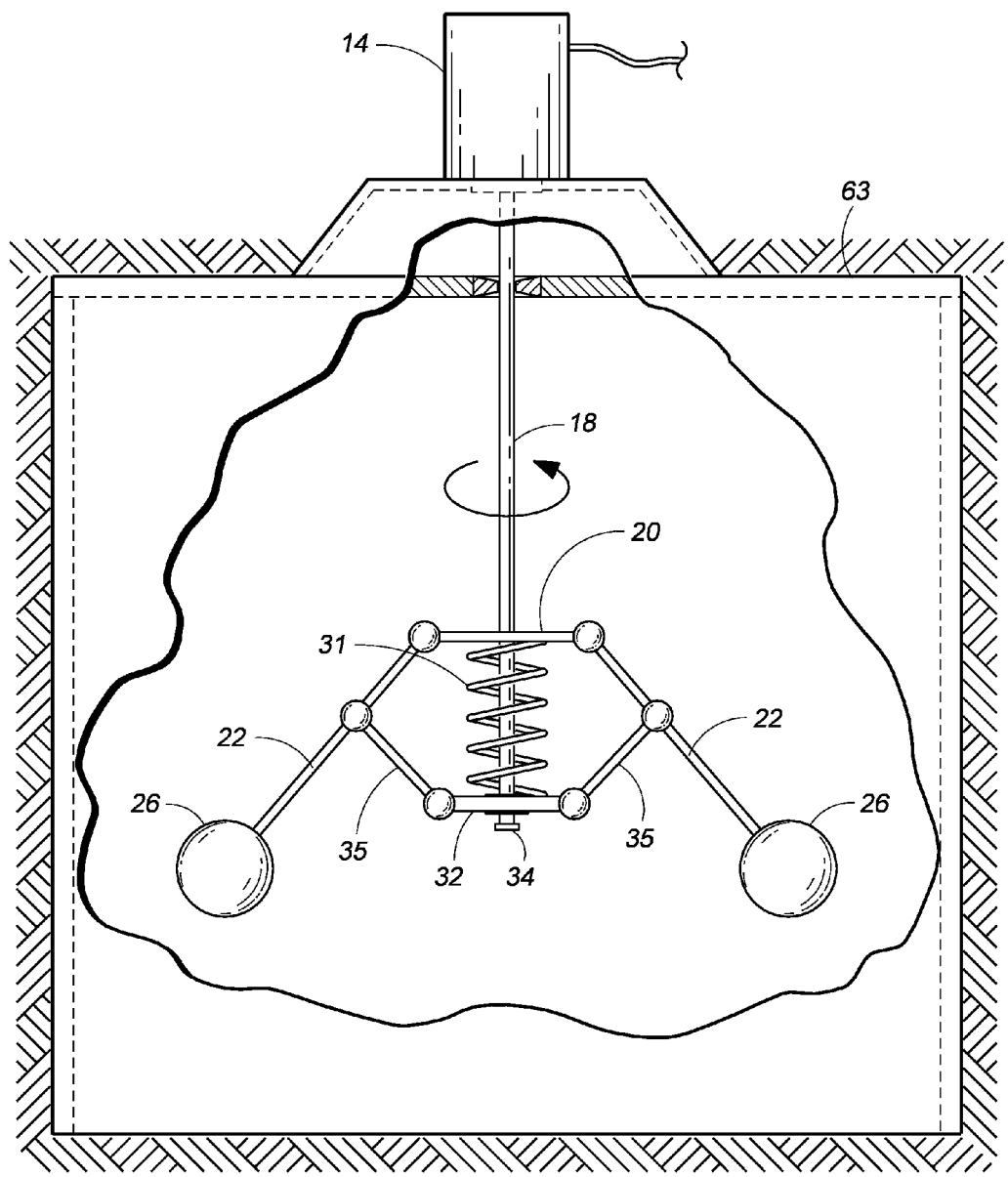
FIG. 7 is a side elevational view, partially broken away, of the support structure holding the present invention, the support structure being disposed underground.

As shown in FIG. 7, any of the embodiments of the present invention can be enclosed in a support structure 63, which is located underground in order to protect the surrounding areas in the event of a structural failure. For example, the device 30 (shown in FIG. 2), will still be driven by a motor-generator 14, which is directly coupled to a main shaft 18, which, in turn, is connected to a fixed plate 20. The concentric main compression spring 31 is disposed around the main shaft 18 between the fixed plate 20 and a sliding plate 32, which has a central opening with a bearing 33, which allows the sliding plate 32 to slide upwards and downwards along the main shaft 18. A stopper 34 at the lower end of the main shaft 18 prevents the sliding plate 32 from falling off the main shaft 18. Linkages 35 couple the sliding plate 32 to the swinging arms 22. During energy storage, the motor-generator 14, acting as a motor, drives the main shaft 18, rotating the fixed plate 20 with attached swinging arms 22 and sliding plate 32. As the swinging arms 22 rotate, centrifugal forces acting on the swinging arms 22 cause the free ends 26 to pivot upwards, thereby also raising the sliding plate 32, which compresses the main compression spring 31 against the bottom of the fixed plate 20. Energy is stored as kinetic energy from the device's 30 rotating moment of inertia and potential energy in the main compression spring 31 as it is deformed and the mass of the swinging arms 25 as they pivot upwards.

Figure 8:
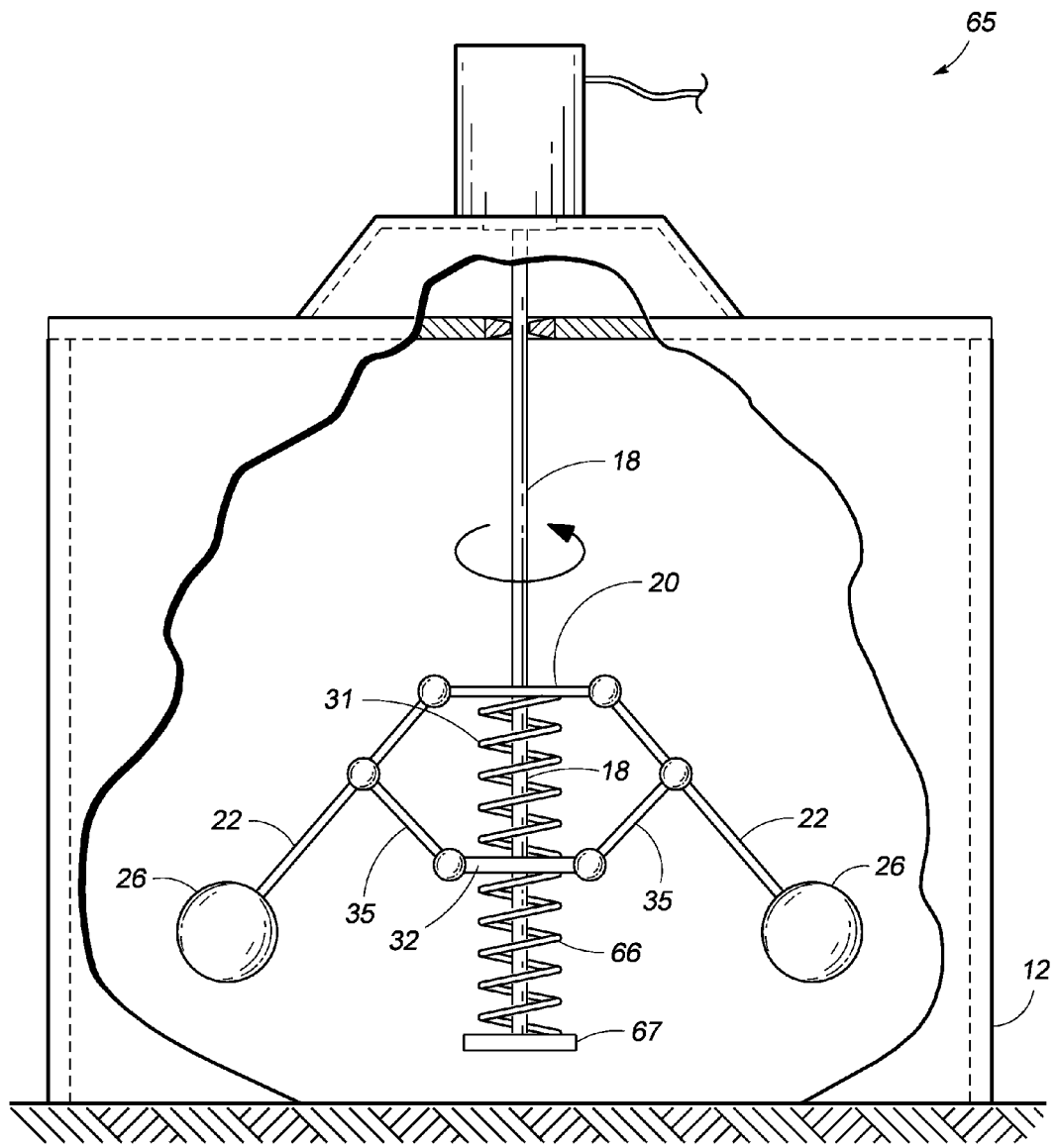
FIG. 8 is a side elevational view, partially broken away, of the support structure holding an alternate embodiment of the present invention, which incorporates a compression spring and a tension spring.

The alternate embodiment of the device 65, shown in FIG. 8, incorporates a tension spring 66, acting in concert with a compression spring 31. The main shaft 18, is connected to a fixed plate 20, and the compression spring 31 is disposed around the main shaft 18 between the fixed plate 20 and a sliding plate 32, which has a central opening with a bearing (not shown), which allows the sliding plate 32 to slide upwards and downwards along the main shaft 18. Linkages 35 couple the sliding plate 32 to the swinging arms 22. A tension spring 66 is affixed to the bottom of the sliding plate 32, and a second fixed plate 67 is affixed to the lower end of the tension spring 66. The rotation of the main shaft 18 causes the swinging arms 22 to rotate, and centrifugal forces acting on the swinging arms 22 cause the free ends 26 to pivot upwards, thereby also raising the sliding plate 32, which compresses the main compression spring 31 against the bottom of the fixed plate 20, while extending tension spring 66, resulting in a larger amount of energy being stored in the springs.

Figure 9:
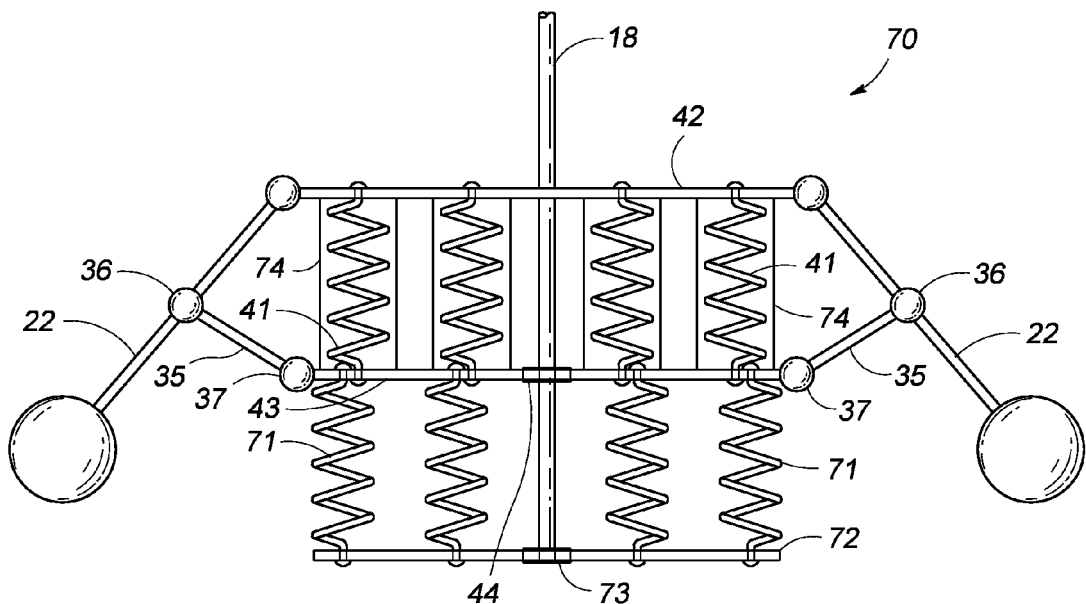
FIG. 9 is a partial side elevational view of an alternate embodiment of the present invention, which incorporates a plurality of paired springs disposed between fixed and slidable plates, all parallel to the main shaft.

Smaller diameter springs tend to have higher spring constants but lower energy storage capabilities, making it likely that multiple springs will be required in some applications. FIG. 9 shows how multiple springs could be positioned in such an embodiment. Like the embodiment shown in FIG. 3, the device 70 utilizes a plurality of compression springs 41 instead of a single main compression spring 31. The compression springs 41 are symmetrically arranged so that each is parallel to the main shaft 18, each spring 41 having one end attached to the fixed plate 42 and a second end attached to the sliding plate 43. The sliding plate 43 has a bearing 44 which allows it to slide upwards and downwards along the main shaft 18. An end of each swinging arm 22 is pivotally connected to the outer edge of the fixed plate 42 at pivot point 24. Linkages 35, each having a first end connected to a swinging arm 22 at pivot point 36 and a second end connected to an outer edge of the sliding plate 43 at pivot point 37, couple the sliding plate 43 to the swinging arms 22. A plurality of tension springs 71 are affixed to the bottom of the sliding plate 43, and a second fixed plate 72 is affixed to the lower ends of the tension springs 71. A stopper 73 prevents fixed plate 72 from losing contact with the main shaft 18. Since the length to diameter ratio of the compression springs 41 is high, buckling will occur unless a tube 74 is placed around each compression spring 41. If tubes 74 are used, the lower side of the fixed plate 42 will be fitted with complementary slots (not shown) so that the tubes 74 are not compressed and ride freely in oscillating vertical motion. Alternatively, to avoid buckling, each of the compressions springs 41 could have a rod or an internal tube (not shown) inserted inside it, with complementary slots in the lower side of the fixed plate 42.

Figure 10:
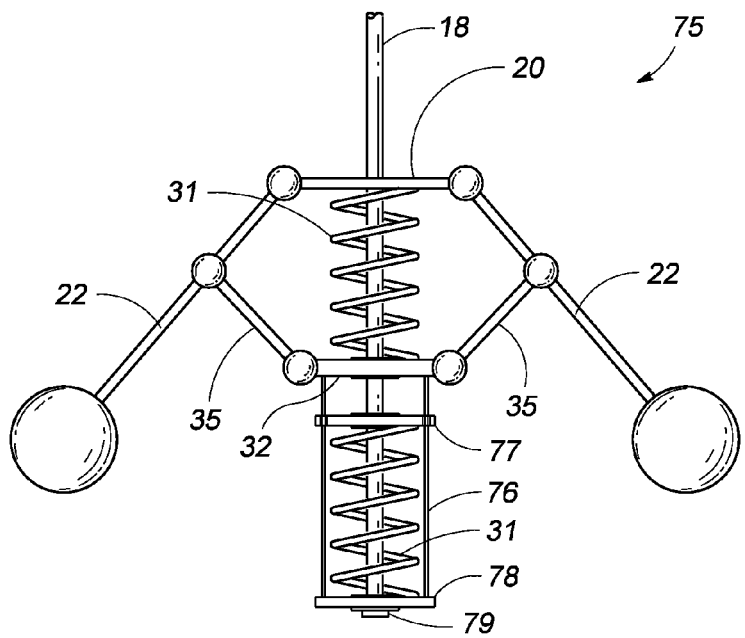
FIG. 10 is a partial side elevational view of an alternate embodiment of the present invention, which incorporates two or more compression springs.

Yet another embodiment is shown in FIG. 10. This device 75 uses two (or more) compression springs 31. The main shaft 18, is connected to a fixed plate 20, and the first compression spring 31 is disposed around the main shaft 18 between the fixed plate 20 and a sliding plate 32, which has a central opening with a bearing (not shown), which allows the sliding plate 32 to slide upwards and downwards along the main shaft 18. Linkages 35 couple the sliding plate 32 to the swinging arms 22. A second compression spring 80 is disposed around the main shaft 18 between the second fixed plate 77 and the second sliding plate 78, which has a central opening with a bearing (not shown), which allows the sliding plate 78 to slide upwards and downwards along the main shaft 18. The two sliding plates 32,78 are connected by tension members 76. A stopper 79 at the lower end of the main shaft 18 prevents the sliding plate 78 from falling off the main shaft 18.

Figure 11:
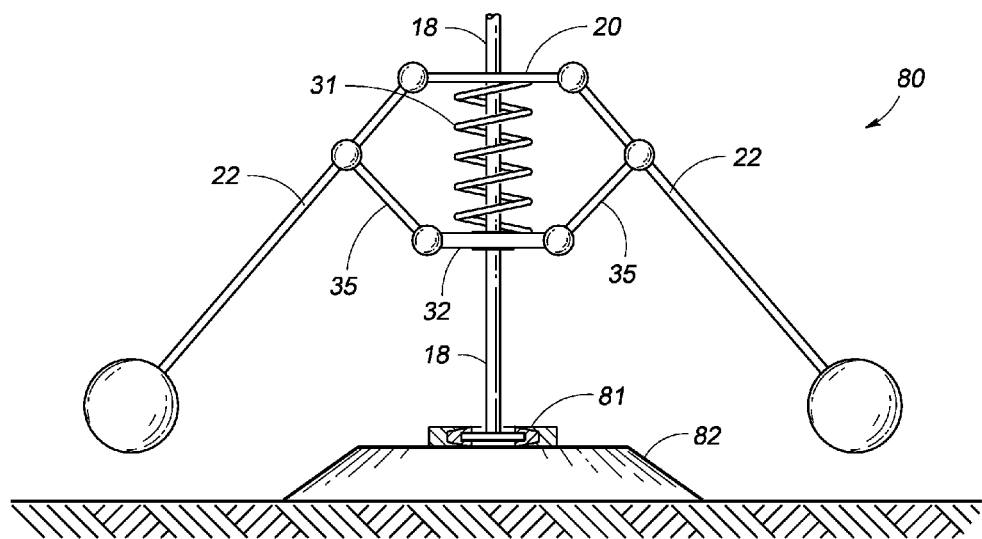
FIG. 11 is partial side elevational view of an alternate embodiment of the present invention, which uses a bearing to keep the shaft centered.

The embodiment 80 in FIG. 11 is similar to that shown in FIG. 2, but it is supported in order to keep the main shaft 18 centered. As shown in FIG. 11, the compression spring 31 is disposed around the main shaft 18 between the fixed plate 20 and a sliding plate 32. Linkages 35 couple the sliding plate 32 to the swinging arms 22. A bearing 81 on the ground or other support 82 is used to keep the main shaft 18 centered.

Figure 12:
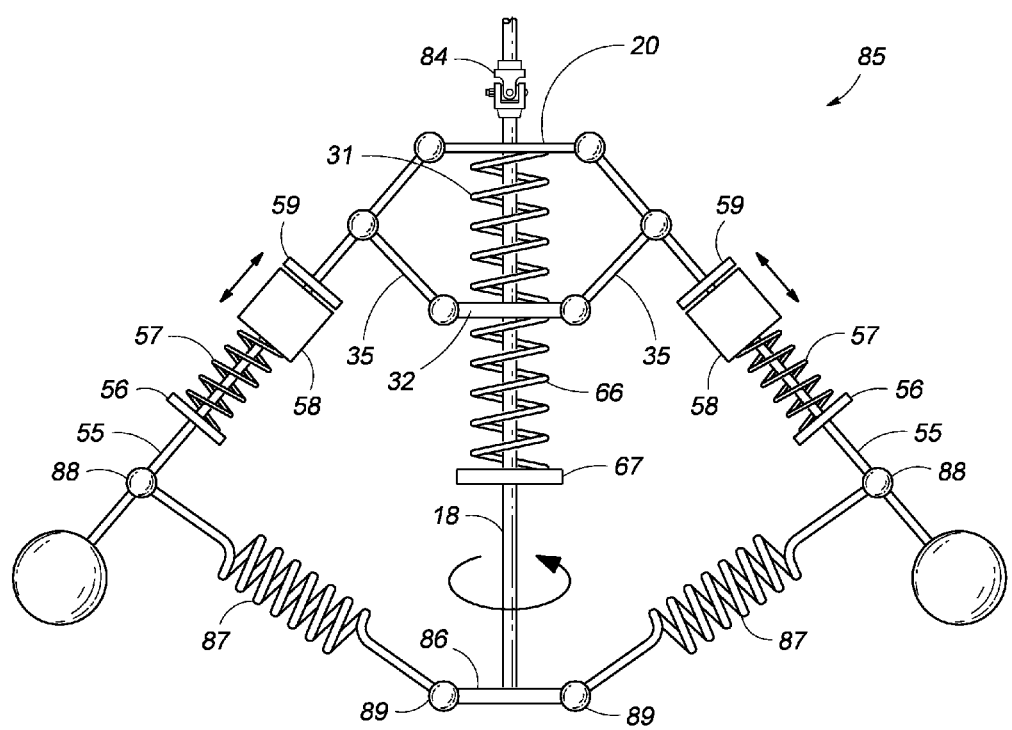
FIG. 12 is a partial side elevational view of an alternate embodiment of the present invention, which combines additional springs for energy storage.

FIG. 12 shows an embodiment of the present invention that combines several of the embodiments described supra, along with additional springs. The device 85 can be hung from a universal joint 84 and can incorporates a tension spring 66, acting in concert with a compression spring 31. The main shaft 18, is connected to a fixed plate 20, and the compression spring 31 is disposed around the main shaft 18 between the fixed plate 20 and a sliding plate 32, which has a central opening with a bearing (not shown), which allows the sliding plate 32 to slide upwards and downwards along the main shaft 18. Linkages 35 couple the sliding plate 32 to the swinging arms 55. A tension spring 66 is affixed to the bottom of the sliding plate 32, and a second fixed plate 67 is affixed to the lower end of the tension spring 66. A first stopper 56 encircles each of the swinging arms 55, then a spring 57 is disposed on each of the swinging arms 55, then a mass 58 with a central bushing or bearing (not shown) is slid onto each of the swinging arms 55, and, finely, a second stopper 59 is affixed to each of the swinging arms 55. The swinging arms 55 are pivotally affixed to an outer edge of a fixed plate 20. A third fixed plate 86 is affixed to the lower end of the main shaft 18. To increase the amount of energy storage, additional side springs 87 can be used, with a first end of each side spring 87 attached to a swinging arm 55 at pivot point 88 and a second end of each side spring 87 attached to the outer edge of plate 86 at pivot point 89.

Figure 13:
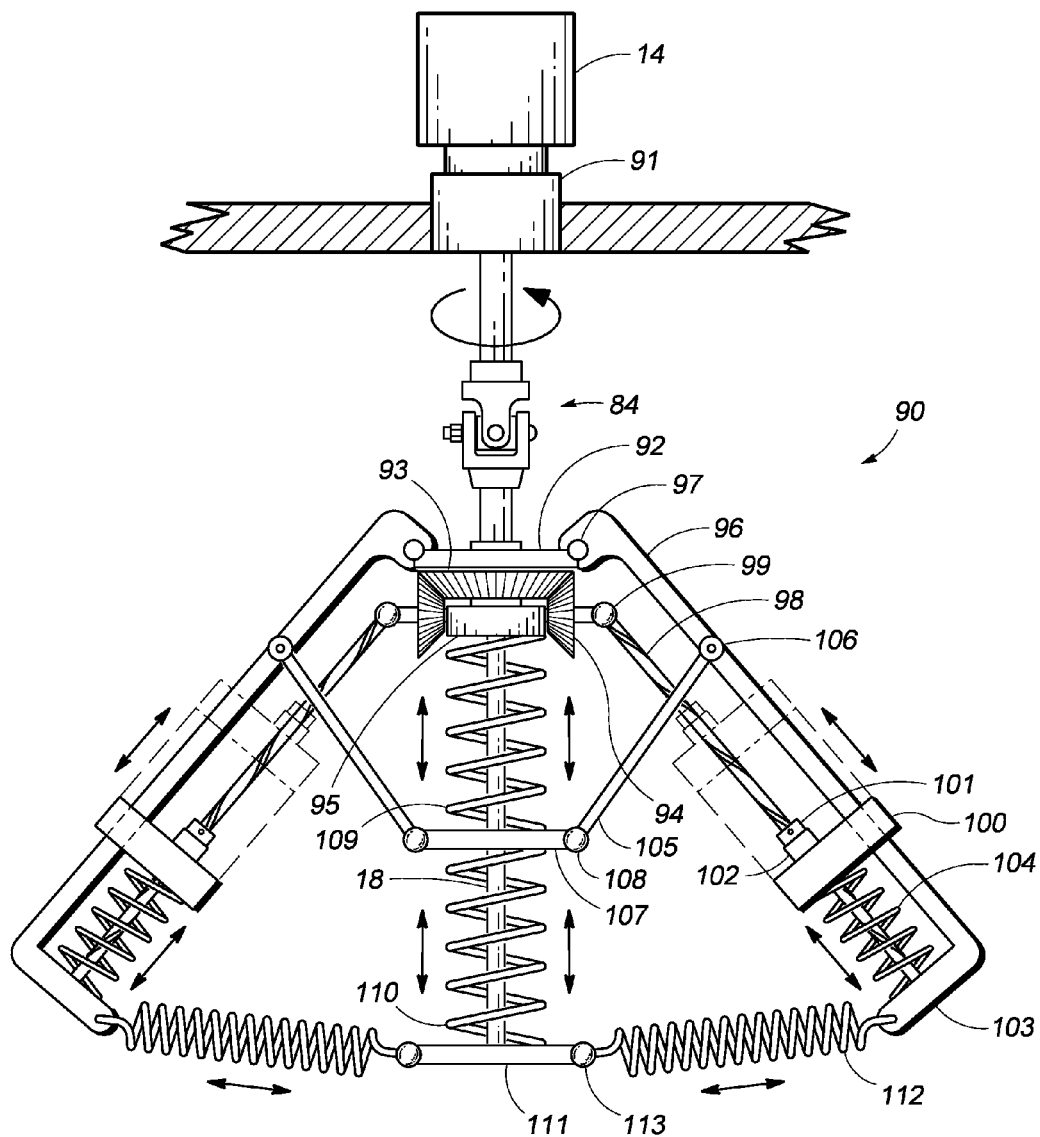
FIG. 13 is a partial side elevational view of an alternate embodiment of the present invention, which combines springs with a coupled geared spline for uniform travel of masses.

FIG. 13 shows an embodiment that uses a combination of interlinked mechanical parts to enhance the energy produced by the device 90. As shown, the device 90, which is driven by a motor-generator 14 is suspended from a support bearing 91. The main shaft 18 is coupled to the motor-generator 14, with a universal joint 84 therebetween. Attached to the main shaft 18 is a fixed plate 92, under which is a common central gear 93, which drives spline gears 94, which are mounted on a spline gear carrier 95. A plurality of arms 96 are pivotally mounted onto the circumference of the fixed plate 92 at pivot point 97. A plurality of spiral splines 98 are each joined to the spline gear carrier 95 by universal joint 99. A sliding mass 100 is mounted onto the spline 98 with a spline rider 101, separated by bearing 102. Each arm 96 has an L-shaped portion 103, and a compression spring 104 is mounted between the upper side of the L-shaped portion 103 of the arm 96 and the lower side of the sliding mass 100. An end of each linkage 105 is pivotally connected to each arm 96 at pivot point 106, while the other end of each linkage 105 is connected to the sliding plate 107, which had been slidably mounted onto the main shaft 18, at pivot point 108. Compression spring 109 is disposed concentric to the main shaft 18 between the bottom side of the spline gear carrier 95 and the top side of the sliding plate 107. An extension spring 110 is disposed concentric to the main shaft 18 between the bottom side of the sliding plate 107 and the top side of second fixed plate 111, which is affixed to the lower end of the main shaft 18. A first end of a second extension spring 112 is affixed to the L-shaped portion 103 of arm 96, with the second end of the second extension spring 112 pivotally connected to the outer edge, or circumference, of second fixed plate 111 at pivot point 113. The device 90 shown in FIG. 13 provides a method a maintaining system dynamic balance for multiple arms 96 with sliding masses 100, specifically by providing a method of linking the sliding masses 100 to provide for their uniform deployment. Each of the sliding masses 100 is keyed to its respective spiral spline 98, and all the splines 98 are interlinked through gearing to a common central gear 93 so that the splines 98 rotate uniformly. The masses 100, which slide on the rotating splines 98, move uniformly on the arms 96 as the rotational speed of the device 90 changes, whether accelerating or decelerating.

It will be understood by those skilled in the art that the embodiments of the present invention are not described with reference to any particular source of energy feeding the electric grid, but can be used with any source of power, including wind, solar and fossil fuels.

We claim:

1. A frequency regulation device for electric power applications comprising:
    a motor-generator;
    a vertical main shaft having a lower end and an upper end, the upper end of the main shaft coupled to the motor-generator;
    a horizontal fixed plate connected to the main shaft, the fixed plate rotating with the main shaft when the main shaft is driven by the motor-generator, the fixed plate having a circumference;
    a plurality of arms, each arm having a free first end, a midsection, and a second end that is pivotally connected to the circumference of the fixed plate;
    a horizontal sliding plate having a circumference and a central opening for slidably mounting the sliding plate on the lower end of the main shaft;
    a plurality of linkages, each linkage pivotally connecting the midsection of one of the arms to the circumference of the sliding plate;
    a plurality of masses;
    a plurality of arm springs; and
    a plurality of spring stoppers;
    each of the masses having a central opening for slidably mounting the mass onto an arm, each of the masses being affixed to one of the arm springs, the spring stoppers used to contain the movement of the masses and the arm springs along each of the arms in response to radial forces acting on the arms; and
    a stopper affixed to the lower end of the main shaft under the sliding plate;
    wherein upon rotation of the main shaft, centrifugal forces acting on the arms cause the free ends of the arms to pivot upwards, thereby causing the linkages to move the sliding plate upwards, resulting in storage of gravitational potential and kinetic energy.

2. The frequency regulation device of claim 1 which further comprises:
    a main compression spring installed concentric to the main shaft under the fixed plate and above the sliding plate.

3. The frequency regulation device of claim 1 which further comprises:
    a gear box coupled to the motor-generator.

4. The frequency regulation device of claim 3 wherein the upper end of the main shaft is coupled to the motor-generator using a universal joint connected to a slip clutch coupled to the gear box in order to absorb torsion and flexion loads.

5. The frequency regulation device of claim 3 wherein the upper end of the main shaft is coupled to the motor-generator using a universal joint connected to a flexible shaft coupled to the gear box in order to absorb torsion and flexion loads.

6. The frequency regulation device of claim 5 wherein the upper end of the main shaft is coupled to the motor-generator using a universal joint connected to the flexible shaft and a slip clutch coupled to the gear box in order to absorb torsion and flexion loads.

7. The frequency regulation device of claim 1 wherein the upper end of the main shaft is coupled to the motor-generator using a universal joint in order to allow the device to achieve a dynamic equilibrium.

8. The frequency regulation device of claim 1 wherein the lower end of the main shaft is supported on a support, the lower end of the main shaft having a bearing to keep the device centered during rotation.

9. The frequency regulation device of claim 1 wherein the device is situated in an enclosure that is equipped with a vacuum pump that is used to reduce air density within the enclosure, thereby reducing drag losses of the device.

10. The frequency regulation device of claim 1 wherein the device is enclosed in a support structure that is located underground.

11. A frequency regulation device for electric power applications comprising:
    a motor-generator;

a vertical main shaft having a lower end and an upper end, the upper end of the main shaft coupled to the motor-generator;

a horizontal fixed plate connected to the main shaft, the fixed plate rotating with the main shaft when the main shaft is driven by the motor-generator, the fixed plate having a circumference;

a plurality of arms, each arm having a free first end, a midsection, and a second end that is pivotally connected to the circumference of the fixed plate;

a horizontal sliding plate having a circumference and a central opening for slidably mounting the sliding plate onto the lower end of the main shaft;

a plurality of linkages, each linkage pivotally connecting the midsection of one of the arms to the circumference of the sliding plate; and a plurality of vertical compression springs symmetrically arranged parallel to the main shaft, each compression spring having an upper end and a lower end, the upper end of each compression spring being attached to the fixed plate and the lower end being attached to the sliding plate;

a plurality of tension springs, each tension spring having an upper end and a lower end; and a horizontal second fixed plate;

the plurality of tension springs symmetrically arranged parallel to the main shaft and having the upper end of each of the tension springs affixed to the sliding plate and the lower end of each tension spring affixed to the second fixed plate;

wherein upon rotation of the main shaft, centrifugal forces acting on the arms cause the free ends of the arms to pivot upwards, thereby causing the linkages to move the sliding plate upwards, thereby compressing the plurality of compression springs, resulting in storage of potential and kinetic energy.

12. The frequency regulation device of claim 11 which further comprises:
a stopper affixed to the lower end of the main shaft under the sliding plate.

13. The frequency regulation device of claim 11 which further comprises:
a gear box coupled to the motor-generator.

14. The frequency regulation device of claim 13 wherein the upper end of the main shaft is coupled to the motor-generator using a universal joint connected to a slip clutch coupled to the gear box in order to absorb torsion and flexion loads.

15. The frequency regulation device of claim 13 wherein the upper end of the main shaft is coupled to the motor-generator using a universal joint connected to a flexible shaft coupled to the gear box in order to absorb torsion and flexion loads.

16. The frequency regulation device of claim 15 wherein the upper end of the main shaft is coupled to the motor-generator using a universal joint connected to the flexible shaft and a slip clutch coupled to the gear box in order to absorb torsion and flexion loads.

17. The frequency regulation device of claim 11 wherein the upper end of the main shaft is coupled to the motor-generator using a universal joint in order to allow the device to achieve a dynamic equilibrium.

18. The frequency regulation device of claim 11 wherein the lower end of the main shaft is supported on a support, the lower end of the main shaft having a bearing to keep the device centered during rotation.

19. The frequency regulation device of claim 11 wherein the device is situated in an enclosure that is equipped with a vacuum pump that is used to reduce air density within the enclosure, thereby reducing drag losses of the device.

20. The frequency regulation device of claim 11 wherein the device is enclosed in a support structure that is located underground.

21. A frequency regulation device for electric power applications comprising:
a motor-generator;
a vertical main shaft having a lower end and an upper end, the upper end of the main shaft coupled to the motor-generator;
a horizontal first fixed plate connected to the main shaft, the first fixed plate rotating with the main shaft when the main shaft is driven by the motor-generator, the first fixed plate having a circumference;
a plurality of arms, each arm having a free first end, a midsection, and a second end that is pivotally connected to the circumference of the fixed plate;
a horizontal sliding plate having a circumference and a central opening for slidably mounting the sliding plate onto the main shaft;
a plurality of linkages, each linkage pivotally connecting the midsection of one of the arms to the circumference of the sliding plate;
a main compression spring installed concentric to the main shaft under the first fixed plate and above the sliding plate;
a tension spring having an upper end and a lower end;
a horizontal second fixed plate, the tension spring installed concentric to the main shaft with the upper end of the tension spring affixed to the sliding plate and the second fixed plate affixed to the lower end of the tension spring;
a horizontal third fixed plate connected to the main shaft, the third fixed plate having a circumference; and
a plurality of side tension springs, each of the side tension springs having a first end and a second end, the first end of each side tension spring being pivotally attached one of the arms and a second end of each side tension spring being attached to the circumference of the third fixed plate;
wherein upon rotation of the main shaft, centrifugal forces acting on the arms cause the free ends of the arms to pivot upwards, thereby causing the linkages to move the sliding plate upwards, thereby compressing the main compression spring, resulting in storage of potential and kinetic energy.

22. The frequency regulation device of claim 21 which further comprises:
a gear box coupled to the motor-generator.

23. The frequency regulation device of claim 21 which further comprises:
a plurality of sliding masses;
a plurality of additional springs, the springs selected from compression and tension springs;
a plurality of stoppers;
each of the sliding masses having a central opening for slidably mounting the mass onto an arm, each of the sliding masses being affixed to one of the additional springs, the stoppers used to contain the movement of the masses and the additional springs along each of the arms in response to radial forces acting on the arms.

24. A frequency regulation device for electric power applications comprising:
a motor-generator;
a universal joint;
a vertical main shaft having a lower end and an upper end, the upper end of the main shaft coupled to the motor-generator using the universal joint;

a horizontal first fixed plate attached to the main shaft, the first fixed plate rotating with the main shaft when the main shaft is driven by the motor-generator, the first fixed plate having a circumference;

a common central gear attached to the main shaft under the first fixed plate;

a spline gear carrier;

a plurality of spline gears mounted on the spline gear carrier;

a plurality of arms, each of the arms having a first end pivotally mounted onto the circumference of the first fixed plate and each of the arms having a second L-shaped end and a midsection;

a plurality of spiral splines, each of the splines joined to the spline gear carrier using a second universal joint, each of the splines arranged parallel to each of the arms;

a plurality of sliding masses, each of the masses mounted onto a pair of the splines and the arms;

a plurality of compression springs, each of the compression springs mounted between the L-shaped end of each of the arms and one of the masses;

a horizontal sliding plate having a circumference and a central opening for slidably mounting the sliding plate onto the main shaft;

a plurality of linkages, each linkage pivotally connecting the midsection of one of the arms to the circumference of the sliding plate;

a main compression spring installed concentric to the main shaft under the common central gear and above the sliding plate;

a tension spring having an upper end and a lower end;

a horizontal second fixed plate, the tension spring installed concentric to the main shaft with the upper end of the tension spring affixed to the sliding plate and the second fixed plate affixed to the lower end of the tension spring; and a plurality of side tension springs, each of the side tension springs having a first end and a second end, the first end of each side tension spring being pivotally attached to the L-shaped portion of one of the arms and a second end of each side tension spring being attached to the circumference of the second fixed plate;

wherein upon rotation of the main shaft, centrifugal forces acting on the arms cause the masses to compress the compression springs, increasing storage of potential and kinetic energy.

25. The frequency regulation device of claim 24 which further comprises:

a gear box coupled to the motor-generator.

26. A frequency regulation device for electric power applications comprising:

a motor-generator;

a vertical main shaft having a lower end and an upper end, the upper end of the main shaft coupled to the motor-generator;

a horizontal fixed plate connected to the main shaft, the fixed plate rotating with the main shaft when the main shaft is driven by the motor-generator, the fixed plate having a circumference;

a plurality of arms, each arm having a free first end, a midsection, and a second end that is pivotally connected to the circumference of the fixed plate;

a horizontal sliding plate having a circumference and a central opening for slidably mounting the sliding plate onto the lower end of the main shaft;

a plurality of linkages, each linkage pivotally connecting the midsection of one of the arms to the circumference of the sliding plate;

a main compression spring installed concentric to the main shaft under the fixed plate and above the sliding plate;

a tension spring having an upper end and a lower end; and a horizontal second fixed plate, the tension spring installed concentric to the main shaft, with the upper end of the tension spring affixed to the sliding plate and the second fixed plate affixed to the lower end of the tension spring;

wherein upon rotation of the main shaft, centrifugal forces acting on the arms cause the free ends of the arms to pivot upwards, thereby causing the linkages to move the sliding plate upwards, thereby compressing the main compression spring, resulting in storage of potential and kinetic energy.

27. A frequency regulation device for electric power applications comprising:

a motor-generator;

a vertical main shaft having a lower end and an upper end, the upper end of the main shaft coupled to the motor-generator;

a horizontal first fixed plate connected to the main shaft, the fixed plate rotating with the main shaft when the main shaft is driven by the motor-generator, the fixed plate having a circumference;

a plurality of arms, each arm having a free first end, a midsection, and a second end that is pivotally connected to the circumference of the fixed plate;

a horizontal first sliding plate having a circumference and a central opening for slidably mounting the sliding plate onto the lower end of the main shaft;

a plurality of linkages, each linkage pivotally connecting the midsection of one of the arms to the circumference of the sliding plate;

a main compression spring installed concentric to the main shaft under the first fixed plate and above the first sliding plate;

a horizontal second fixed plate connected to the main shaft under the horizontal first sliding plate;

a horizontal second sliding plate disposed under the second fixed plate;

tension members connecting the second sliding plate to the first sliding plate;

a second compression spring installed concentric to the main shaft between the second fixed plate and the second sliding plate;

a stopper affixed to the lower end of the main shaft under the second sliding plate;

wherein upon rotation of the main shaft, centrifugal forces acting on the arms cause the free ends of the arms to pivot upwards, thereby causing the linkages to move the sliding plates upwards, thereby compressing the main compression spring and the second compression spring, resulting in storage of potential and kinetic energy.

* * * * *